United States Patent [19]

Ogawa et al.

[11] 4,420,419

[45] Dec. 13, 1983

[54] ABRASION-RESISTANT GRANULAR ZEOLITE AND PROCESS FOR PREPARATION THEREOF

[75] Inventors: Masahide Ogawa; Tetsuo Masuko, both of Shibata; Kunio Goto; Hideo Sugai, both of Nakajo; Masao Takahashi, Shiunji, all of Japan

[73] Assignee: Mizusawa Kagaku Kogyo Kabushiki Kaisha, Osaka, Japan

[21] Appl. No.: 355,380

[22] Filed: Mar. 8, 1982

[30] Foreign Application Priority Data

Mar. 10, 1981 [JP] Japan .................................. 56-33138

[51] Int. Cl.$^3$ ........................ B01J 29/08; B01J 29/18; B01J 35/08
[52] U.S. Cl. .......... 502/68; 502/301; 502/78; 502/79
[58] Field of Search ........................ 252/455 Z, 477 R

[56] References Cited

U.S. PATENT DOCUMENTS

| | | | |
|---|---|---|---|
| 2,973,327 | 2/1961 | Mitchell et al. | 252/455 Z |
| 3,055,841 | 9/1962 | Gladrow et al. | 252/455 Z |
| 3,065,054 | 11/1962 | Haden, Jr. et al. | 252/455 Z |
| 3,181,231 | 5/1965 | Breck | 252/455 Z |
| 3,219,590 | 11/1965 | Ribaud | 252/455 Z |
| 3,262,890 | 7/1966 | Mitchell et al. | 252/455 Z |
| 3,356,450 | 12/1967 | Heinze | 252/455 Z |
| 4,157,375 | 6/1979 | Brown et al. | 423/118 X |

*Primary Examiner*—Carl F. Dees
*Attorney, Agent, or Firm*—Sherman & Shalloway

[57] ABSTRACT

Disclosed is an abrasion-resistant granular zeolite formed from a mixture of a synthetic zeolite and a clay binder, said granular zeolite comprising a core composed of a synthetic zeolite clay binder mixture containing the synthetic zeolite at a content higher than the average synthetic zeolite content in the granular zeolite and a shell composed of a synthetic zeolite-clay binder mixture containing the clay binder at a content higher than the average clay binder content in the granular zeolite.

This granular zeolite is excellent in both the zeolitic characteristics such as adsorbability and ion exchange capacity and the mechanical strength characteristics such as abrasion resistance and compression strength.

8 Claims, 2 Drawing Figures

(×240)

(×240)

ABRASION-RESISTANT GRANULAR ZEOLITE AND PROCESS FOR PREPARATION THEREOF

BACKGROUND OF THE INVENTION (1) Field of the Invention

The present invention relates to an abrasion-resistant granular zeolite and a process for the preparation thereof. More particularly, the present invention relates to an improvement for increasing the abrasion resistance of a granular zeolite without reduction of the zeolitic characteristics of the zeolite.

(2) Description of the Prior Art

A synthetic zeolite is valuable as a drying agent, a molecular sieve, an ion exchanger or a catalyst carrier. However, the synthetic zeolite per se is a very fine crystalline powder having no binding property, and in order to convert this powder to a granule which is easy to handle, it is necessary to mix this powder with a clay binder such as kaolin, attapulgite or allophane and granulate the mixture.

In order to improve the mechanical properties, such as the compression strength, of the so prepared granular zeolite, it is necessary to incorporate a considerably large amount of the clay binder into the zeolite powder, and therefore, reduction of the zeolitic characteristics such as the adsorbing characteristic and ion exchange capacity is readily caused. Therefore, the mixing ratio of the clay binder has heretofore been controlled within the range of 20 to 30% by weight so as to maintain a good balance between the zeolitic characteristics and the mechanical strength characteristics.

In various application fields of granular zeolites, however, it is always required to improve the mechanical strength characteristics, especially the abrasion resistance and compression strength, without reduction of the zeolitic characteristics. For example, a granular zeolite to be used as an air brake drier should have an abrasion resistance sufficient to resist violent vibrations and a water-absorbing property enough to prevent dew condensation, freezing or corrosion in the brake system for a long time should stably be maintained over a long period of time.

SUMMARY OF THE INVENTION

It is therefore a primary object of the present invention to provide a granular zeolite having a novel coated structure, which is excellent in either the zeolitic characteristics such as the adsorbability and ion exchange capacity or the mechanical strength characteristics such as the abrasion resistance and compression strength.

Another object of the present invention is to provide a process in which the above-mentioned excellent granular zeolite can be prepared at a low cost with ease.

More specifically, in accordance with one aspect of the present invention, there is provided an abrasion-resistant granular zeolite formed from a mixture of a synthetic zeolite and a clay binder, said granular zeolite comprising a core composed of a synthetic zeolite-clay binder mixture containing the synthetic zeolite at a content higher than the average synthetic zeolite content in the granular zeolite and a shell composed of a synthetic zeolite-clay binder mixture containing the clay binder at a content higher than the average clay binder content in the granular zeolite.

In accordance with another aspect of the present invention, there is provided a process for the preparation of an abrasion-resistant granular zeolite, which comprises the steps of granulating a mixture of a synthetic zeolite and a clay binder containing the synthetic zeolite at a content higher than the average synthetic zeolite content by using an aqueous solution of a water-soluble polymeric binder as a granulating medium, dry-blending the resulting particles with a powdery mixture of the synthetic zeolite and the clay binder containing the clay binder at a content higher than the average clay binder content to form a coating of said powdery mixture on the surfaces of the particles, and drying and calcining the resulting coated particles.

DETAILED DESCRIPTION OF THE PREFERRED EMBODIMENTS

Figure 1:
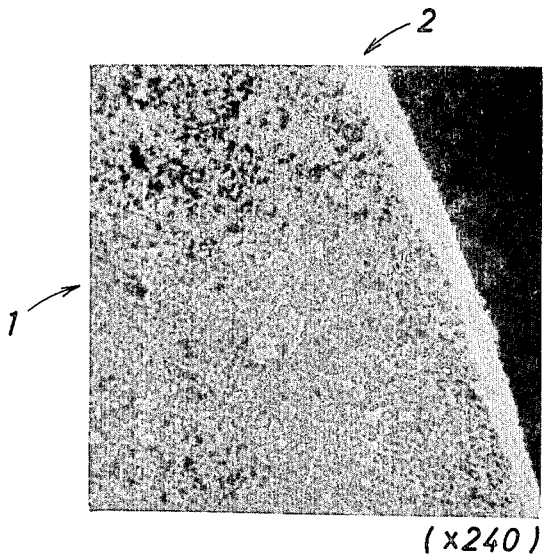
FIG. 1 is an electron microscope photograph (240 magnifications) showing the sectional structure of a granular zeolite of the present invention (sample S-1 obtained in Example 1), in which reference numeral 1 represents the core portion and reference numeral 2 represents the shell portion.
Figure 2:
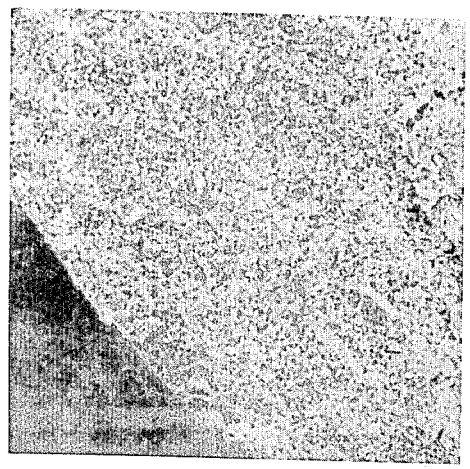
FIG. 2 is an electron microscope photograph (240 magnifications) showing the sectional structure of a comparative granular zeolite (sample S-5 obtained in Example 1).

Referring to FIG. 1 illustrating the sectional structure of the granular zeolite according to the present invention, this granular zeolite has a sectional structure comprising a core 1 and a shell 2. In the granular zeolite of the present invention, the core 1 contains a synthetic zeolite at a content higher than the average synthetic zeolite content, and the shell 2 contains a clay binder at a content higher than the average clay binder content. This is the most characteristic feature of the granular zeolite of the present invention.

More specifically, the granular zeolite of the present invention is characteristic over the conventional granular zeolite in which the synthetic zeolite and clay binder are present at the same ratio throughout the section in the point where since the content of the clay binder in the shell is higher than the average clay binder content, the granular zeolite of the present invention has highly improved abrasion resistance and compression strength and since the content of the synthetic zeolite in the core is higher than the average synthetic zeolite content, the granular zeolite of the present invention shows excellent zeolitic characteristics such as high adsorption rate and adsorptive capacity. Such prominent improvements of the mechanical characteristics and zeolitic characteristics can be attained in the granular zeolite of the present invention even if the thickness of the shell is very small.

In the granular zeolite of the present invention, from the viewpoint of the adsorption speed and ion exchange speed, it is very important that the shell is composed of a mixture of the clay binder and synthetic zeolite. It has been found that the adsorption speed of the granular zeolite of the present invention is much higher than that of a granular zeolite comprising a shell composed solely of the clay binder. It is believed that this improvement of the adsorption speed will probably be due to the fact that the synthetic zeolite present in the shell acts as a passage for a substance to be adsorbed. Moreover, in order to increase the strength of the granular zeolite as a whole, it is important that the core should be formed of a mixture of the synthetic zeolite and clay binder. It must be understood that when the granular zeolite of the present invention is compared with a conventional granular zeolite having the same abrasion resistance and compression strength as those of the granular zeolite of the present invention, the overall clay binder content can remarkably be reduced and the adsorption speed and adsorptive capacity can prominently be improved in the granular zeolite or the present invention, and that when the granular zeolite of the present invention is compared with a conventional granular zeolite having the same adsorptive capacity as that of the granular zeolite of the present invention, the abrasion resistance and compression strength can highly be improved in the granular zeolite of the present invention.

In the granular zeolite of the present invention, the ratio of the core to the shell differs to some extent according to the size of the granular zeolite or the particle size of the synthetic zeolite, but it is ordinarily preferred that the core/shell weight ratio be in the range of from 99/1 to 80/20, especially from 98/2 to 85/15. When the proportion of the shell is too small and below the above range, the mechanical properties are reduced, and if the proportion of the shell is too large and exceeds the above range, the zeolitic characteristics such as the adsorbability tend to decrease. If the size of the granular zeolite is relatively large, the proportion of the shell may be adjusted to a relatively low level within the above range, and if the size of the granular zeolite is relatively small, the proportion of the shell may be adjusted to a relatively high level within the above range.

In the present invention, the mixture constituting the core 1 contains the synthetic zeolite and clay binder at a weight ratio of from 90/10 to 60/40, especially from 88/12 to 70/30, while the mixture constituting the shell 2 contains the clay binder and synthetic zeolite at a weight ratio of from 95/5 to 30/70, especially from 70/30 to 50/50. From the viewpoint of the balance between the mechanical strength characteristics and the zeolitic characteristics, it is preferred that the shell contains the clay binder at a content higher by at least 10% by weight, especially by at least 15% by weight, than the clay binder content in the core.

In the present invention, as the synthetic zeolite, there can be used zeolite A, zeolite X, zeolite Y and synthetic mordenite. These zeolites may be used singly or in the form of a mixture of two or more of them. These zeolites may be present in the optional form, for example, any of sodium, potassium and calcium types. The particle size of the synthetic zeolite powder can be 0.01 to 100 microns, especially 0.1 to 50 microns.

As the clay binder, there can be used, for example, kaolin type minerals such as kaolin, palygorskite type minerals such as attapulgite, smectite type clay minerals such as acid clay, montmorillonite and bentonite, and allophane. These clay binders may be used singly or in the form of a mixture of two or more of them. The size of the clay binder can be 0.1 to 10 microns, especially 0.5 to 5 microns.

In preparing the granular zeolite of the present invention, a synthetic zeolite-clay binder mixture having the above-mentioned composition for the core is granulated into a core by using an aqueous solution of a water-soluble polymeric binder as a granulating medium. Mixing of the synthetic zeolite and clay mineral can be accomplished by dry blending using a known mixer such as a ribbon blender, a conical blender or a Henschel mixer. Granulation of the above mixture can be accomplished by using the above-mentioned aqueous solution as the granulating medium according to a known granulating method such as rolling granulation, extrusion granulation, spray granulation, tableting granulation or fluidized bed granulation. The rolling granulation method is especially preferred from the viewpoint of the mechanical strength of the granular zeolite, and there may be adopted a method in which seed particles of the synthetic zeolite-clay binder mixture are first prepared and a powder of the above mixture is sprinkled on the seed particles while these seed particles are wetted with the granulating medium, whereby the growth of the particles is accomplished.

The water-soluble polymeric binder can be used in an amount of 0.01 to 5% by weight, especially 0.05 to 2% by weight, as solids based on the total amount of the synthetic zeolite and clay binder. The amount used of the aqueous solution as the granulating medium is preferably 20 to 70% by weight, especially 30 to 60% by weight, based on the total amount of the synthetic zeolite and clay binder, through the amount of the aqueous solution is changed to some extent according to the granulating means.

As the water-soluble polymeric binder, there can be used starch, cyanoethylated starch, carboxymethylated starch, carboxymethyl cellulose, methyl cellulose, hydroxyethyl cellulose, polyvinyl alcohol, vinyl ether-maleic acid copolymers, sodium alginate, sodium ligninsulfonate, gum arabic and tragacanth gum.

In the present invention, the core particles obtained at the above-mentioned step are dry-blended with a powdery mixture of the synthetic zeolite and clay binder having the above-mentioned composition for the shell to form a coating of the powdery mixture on the surfaces of the core particles. The amount of the powdery mixture dry-blended on the core particles is within the above-mentioned range, and the core particles formed by the above-mentioned means still contains the aqueous solution as the granulating medium in the interior and the powdery mixture is tightly stuck to the core particles because of the presence of the aqueous solution to form a coating on the surfaces of the core particles. Dry-blending of the core particles with the powdery mixture can easily be accomplished, preferably according to a method in which the powdery mixture is charged at one time or at several times in a divided manner to a rolling granulator in which the formed core particles are contained and the granulator is operated.

In the present invention, the synthetic zeolite and clay binder forming the shell may be the same as or different from the synthetic zeolite and clay binder forming the core.

According to the present invention, the granule having a core-shell structure is thus prepared, and the granule is air-dried and calcined at a temperature of 300° to 650° C. for 10 to 300 minutes to obtain a final granular zeolite product.

In the granular zeolite of the present invention, the size can widely be changed according to the intended use of the granular zeolite. Ordinarily, however, the granular zeolite of the present invention is applied to various uses in the form of spherical particles having a particle size of 0.5 to 10 mm, especially 1 to 5 mm.

The granular zeolite of the present invention has a double structure comprising a compact and strong shell and a core excellent in the zeolitic characteristics, and since this shell contains the synthetic zeolite and has no barrier action to a substance to be adsorbed, the granular zeolite of the present invention is excellent in the combination of the mechanical strength characteristics and zeolitic characteristics. Therefore, the granular zeolite of the present invention can advantageously be used as a drier, an adsorber, a molecular sieve, a catalyst carrier, an ion exchanger and the like.

For example, this granular zeolite can strongly adsorb not only steam and water but also hydrogen sulfide, ammonia, sulfur dioxide, carbon dioxide and carbon monoxide and can advantageously be used for drying of an olefin gas for drying air for a brake or meter, dehydration of an organic solvent, dehydration of a freezer, dehydration of an insulating oil, dehydration and drying of a compression fluid, purification of hydrogen, purification of natural gas or LPG and drying of foods to be packaged.

The present invention will now be described in detail with reference to the following Examples that by no means limit the scope of the invention.

EXAMPLE 1

A spherical zeolite excellent in the abrasion resistance and adsorbability is illustrated in this Example.

The core of the spherical zeolite was prepared in the following manner.

To 80 parts by weight of a dry powder of a 4A-type synthetic zeolite dried at 150° C. was added 20 parts by weight of a dry powder of kaolin dried at 150° C., and the mixture was sufficiently blended in a V-shaped mixer to prepare a mixed powder of the synthetic zeolite and kaolin. Then, a part (about 25 Kg) of the obtained mixed powder was charged into a rolling granulator and rolling granulation was carried out while spraying water to the mixture from a spray nozzle. The granulation product was classified by a sieve to remove fine powders and obtain a spherical molded product having a size of 0.25 to 0.5 mm.

While the so-prepared core seed particles were being rolled in the rolling granulator, the above-mentioned powdery mixture comprising 80 parts by weight of the synthetic zeolite and 20 parts by weight of kaolin and a 0.5% aqueous solution of sodium lignin-sulfonate were gradually added to the seed particles to grow zeolite layers on the seed particles over a period of 2 hours, whereby a wet spherical zeolite core was prepared.

A powdery mixture having a composition shown in Table 1 was prepared as a shell component.

TABLE 1

| Sample | Powdery Mixture as Shell Component |
| --- | --- |
| S-1 (present invention) | 96 parts by weight of kaolin and 4 parts by weight of zeolite |
| S-2 (present invention) | 50 parts by weight of kaolin and 50 parts by weight of zeolite |
| S-3 (present invention) | 32 parts by weight of kaolin and 68 parts by weight of zeolite |
| S-4 (comparison) | kaolin alone |
| S-5 (comparison) | not coated but dried and calcined |

While 60 Kg of the so-prepared core was being rolled in the rolling granulator, 3 Kg of the powdery mixture S-1, S-2, S-3, S-4 or S-5 was added, and after addition of the powdery mixture, rolling was further conducted for 5 to 10 minutes to effect surface coating, whereby a spherical zeolite having a diameter of 1.5 to 3.0 mm was obtained. The so-prepared wet spherical zeolite was air-dried (naturally dried), then dried in an atmosphere maintained at 100° to 150° C. for 3 hours and calcined at 550±30° C. for 3 hours.

The so-obtained spherical zeolite was tested with respect to the compression strength, wear rate, pack density, equilibrium water absorption and water adsorption speed according to the methods described below. The obtained results are shown in Table 2.

1. Compression Strength

The compression breaking strength was measured on 20 samples by a Kiya-type hardness meter (maximum measurable value = 10 Kg) (supplied by Kiya Seisakusho), and a mean value of 18 values exclusive of the maximum and minimum values was calculated and expressed as the compression strength.

2. Wear Rate

Water was adsorbed in a glass vessel having a capacity of 150 ml to the saturation degree, and 40 g of the sample dried at 150° C. for 3 hours and 100 ml of water were charged in the glass vessel. Then, the glass vessel was attached to a paint conditioner (supplied by Red Devil Inc.) and shaken for 30 minutes. Then, the powder adhering to the sample was removed and the sample was dried at 130° C. The weight of the sample was measured and the wear rate (%) was calculated according to the following formula:

$$\text{Wear rate (\%)} = \left(1 - \frac{\text{weight of sample after abrasion test}}{\text{weight of sample before abrasion test}}\right) \times 100$$

3. Pack Density

A graduated cylinder having a capacity of 500 ml was charged with 200 g of the sample, and the cylinder was lightly tapped on a rubber plate and the volume of the sample was read when the volume V (l) of the sample was not changed any more. The pack density was determined according to the following formula:

$$\text{Pack density (g/l)} = \frac{200}{V}$$

4. Equilibrium Water Absorption

The sample (0.15 g) was placed in a quartz microbalance water adsorption tester, and deaeration was carried out at 200° C. for 2 hours. Then, the equilibrium water adsorption at a temperature of 20° C. and a relative humidity of 75% was determined according to the following formula:

$$\text{Equilibrium water adsorption (\%)} = \frac{\text{amount (g) of adsorbed water}}{100 \text{ g of sample}} \times 100$$

5. Water Adsorption Speed

The sample (0.15 g) having a particle size of 1.5 to 1.6 mm was placed in a quartz microbalance water adsorption tester, and deaeration was carried out at 200° C. for 2 hours. The amount (mg) of water adsorbed was measured at a temperature of 20° C. and a relative humidity of 20% at an interval of 1 minute. The time (unit:minute) and the amount (unit:mg) of adsorbed water were plotted on the abscissa and ordinate, respectively, to obtain a water adsorption curve. The gradient of a line formed by connecting the point of the amount of adsorbed water at the adsorption time of 10 minutes to the origin was determined and defined as the water adsorption rate. The unit of the water adsorption rate was g/100 g of sample/min.

TABLE 2

|  | Samples of Present Invention | | | Comparative Samples | |
| --- | --- | --- | --- | --- | --- |
|  | S-1 | S-2 | S-3 | S-4 | S-5 |
| Compression strength (Kg) | 5.7 | 4.3 | 3.8 | 6.3 | 2.0 |
| Wear rate (%) | 1.7 | 4.0 | 4.8 | 1.2 | 12.8 |
| Pack density (g/l) | 880 | 870 | 870 | 885 | 840 |
| Equilibrium water adsorption (%) | 18.20 | 21.90 | 22.15 | 15.56 | 22.80 |
| Water adsorption rate (g/100 g of sample/min) | 0.90 | 1.30 | 1.35 | 0.50 | 1.49 |

EXAMPLE 2

While 60 Kg of the wet spherical zeolite core prepared in the same manner as described in Example 1 was being rolled in a rolling granulator, 1 Kg (S-6), 5 Kg (S-7) or 7.5 Kg (S-8) of the coating powder corresponding to the sample S-2 shown in Table 1 was added and the coating operation was carried out in the same manner as described in Example 1 to obtain a granulation product having a particle size of 1.5 to 3.0 mm. Then, the granulation product was dried and calcined in the same manner as described in Example 1 to obtain a spherical zeolite product.

The obtained spherical zeolite was tested with respect to the compression strength, wear rate, pack density, equilibrium water adsorption and water adsorption speed according to the methods described in Example 1. The obtained results are shown in Table 3.

TABLE 3

|  | S-6 | S-7 | S-8 |
| --- | --- | --- | --- |
| Compression strength (Kg) | 3.5 | 5.0 | 6.0 |
| Wear rate (%) | 5.1 | 1.6 | 1.3 |
| Pack density (g/l) | 870 | 875 | 880 |
| Equilibrium water adsorption (%) | 22.10 | 21.84 | 21.75 |
| Water adsorption speed (g/100 g of sample/min) | 1.33 | 1.30 | 1.27 |

EXAMPLE 3

The core of the spherical zeolite was prepared in the following manner.

To 88 parts by weight of a dry powder of a 4A-type synthetic zeolite was added 12 parts by weight of a dry powder of kaolin, and the mixture was sufficiently blended in a V-shaped mixer. The obtained mixed powder was molded into seed particles by a rolling granulator in the same manner as described in Example 1, whereby a core of the spherical zeolite was prepared.

While 60 Kg of the so-obtained wet granular zeolite core was being rolled in a rolling granulator, 5 Kg of a powder obtained by sufficiently blending 70 parts by weight of kaolin with 30 parts by weight of the synthetic zeolite was added as the shell component, and the coating treatment was carried out in the same manner as described in Example 1 to obtain a granulation product having a diameter of 1.5 to 3.0 mm. Then, the granulation product was dried and calcined in the same manner as described in Example 1 to obtain a spherical zeolite product. This spherical zeolite product was tested with respect to the compression strength, wear rate, pack density, equilibrium water adsorption and water adsorption speed according to the methods described in Example 1. The obtained results are shown in Table 4.

TABLE 4

|  | Sample of Example 3 |
| --- | --- |
| Compression strength (Kg) | 2.9 |
| Wear rate (%) | 3.2 |
| Pack density (g/l) | 840 |
| Equilibrium water adsorption (%) | 22.70 |
| Water adsorption speed (g/100 g of sample/min) | 1.40 |

EXAMPLE 4

The core of the spherical zeolite was prepared in the following manner.

To 70 parts by weight of a powder of a 4A type synthetic zeolite dried at 150° C. was added 30 parts by weight of a powder of attapulgite dried at 150° C., and the mixture was sufficiently blended to obtain a mixed powder of the synthetic zeolite and attapulgite. The so-obtained mixed powder was rolled and molded in seed particles in a rolling granulator in the same manner as described in Example 1, whereby a core of the spherical zeolite was prepared.

While 60 Kg of the so-prepared wet granular zeolite core was being rolled in a rolling granulator, 5 Kg of a powdery mixture obtained by sufficiently blending 50 parts by weight of attapulgite with 50 parts by weight of the synthetic zeolite was added as the shell component, and the coating treatment was carried out in the same manner as described in Example 1 to obtain a granulation product having a diameter of 1.5 to 3.0 mm. The granulation product was dried and calcined in the same manner as described in Example 1. The obtained spherical zeolite was tested with respect to the compression strength, wear rate, pack density, equilibrium water adsorption and water adsorption speed according to the methods described in Example 1. The obtained results are shown in Table 5.

TABLE 5

|  | Sample of Example 4 |
| --- | --- |
| Compression strength (kg) | 7.8 |
| Wear rate (%) | 1.0 |
| Pack density (g/l) | 890 |
| Equilibrium water adsorption (%) | 19.5 |
| Water adsorption speed (g/100 g of sample/min) | 1.15 |

EXAMPLE 5

The core of the spherical zeolite was prepared in the following manner.

To 80 parts by weight of a powder of a 13X type synthetic zeolite dried at 150° C. was added 20 parts by weight of a powder of acid clay dried at 150° C., and the mixture was sufficiently blended to obtain a mixed powder of the synthetic zeolite and acid clay. The so-obtained mixed powder was rolled and molded in seed particles in a rolling granulator in the same manner as described in Example 1, whereby a core of the spherical zeolite was prepared.

While 60 Kg of the so-prepared wet granular zeolite core was being rolled in a rolling granulator, 5 Kg of a powdery mixture obtained by sufficiently blending 50 parts by weight of acid clay with 50 parts by weight of the synthetic zeolite was added as the shell component, and the coating treatment was carried out in the same manner as described in Example 1 to obtain a granulation product having a diameter of 1.5 to 3.0 mm. The granulation product was dried and calcined in the same manner as described in Example 1. The obtained spherical zeolite was tested with respect to the compression strength, wear rate, pack density, equilibrium water adsorption and water adsorption speed according to the methods described in Example 1. The obtained results are shown in Table 6.

TABLE 6

|  | Sample of Example 4 |
|---|---|
| Compression strength (Kg) | 7.5 |
| Wear rate (%) | 1.0 |
| Pack density (g/l) | 760 |
| Equilibrium water adsorption (%) | 24.75 |
| Water adsorption speed (g/100 g of sample/min) | 1.85 |

What is claimed is:

1. An abrasion-resistant granular zeolite formed from a mixture of a synthetic crystalline zeolite and a clay binder, said granular zeolite comprising a core composed of a synthetic zeolite-clay binder mixture containing the synthetic zeolite at a content higher than the average synthetic zeolite content in the total granular zeolite and a shell composed of a synthetic zeolite-clay binder mixture containing the clay binder at a content higher than the average clay binder content in the total granular zeolite, wherein the core and shell are present at a core/shell weight ratio of from 99/1 to 80/20, the core contains the synthetic zeolite and clay binder at a zeolite/binder weight ratio of from 90/10 to 60/40, the shell contains the clay binder and synthetic zeolite at a binder/zeolite weight ratio of from 95/5 to 30/70, the shell contains the clay binder at a content higher by at least 10 by weight than the binder content in the core, and said core and shell being calcined to harden the clay binder.

2. A granular zeolite as set forth in claim 1, wherein the synthetic zeolite is zeolite A, zeolite X, zeolite Y or synthetic mordenite.

3. A granular zeolite as set forth in claim 1, wherein the clay binder is a kaolin type clay mineral, a palygorskite clay mineral or a smectite clay mineral.

4. A granular zeolite as set forth in claim 1, wherein core and shell are present at a core/shell weight ratio of from 98/2 to 85/15.

5. A granular zeolite as set forth in claim 1, wherein the core contains the synthetic zeolite and clay binder at a zeolite/binder weight ratio of from 88/12 to 70/30, the shell contains the clay binder and synthetic zeolite at a binder/zeolite weight ratio of from 70/30 to 50/50, and the shell contains the clay binder at a content higher by at least 15% by weight than the binder content in the core.

6. A process for the preparation of an abrasion-resistant granular zeolite, which comprises the steps of granulating a primary mixture containing a synthetic zeolite and a clay binder at a zeolite/binder weight ratio of from 90/10 to 60/40 by using an aqueous solution of a water-soluble polymeric binder as a granulating medium, thereby to form wet core particles, dry-blending the resulting wet core particles with a secondary powdery mixture containing the synthetic zeolite and the clay binder at a binder/zeolite weight ratio of from 95/5 to 30/70 to form a shell coating of said powdery mixture on the surface of the core particles, said secondary mixture containing the clay binder at a content higher by at least 10% by weight than the clay binder content in the primary mixture and drying and calcining the resulting coated particles.

7. A process according to claim 6, wherein the water-soluble polymeric binder is present in an amount of 0.01 to 5% by weight, as solids, based on the total amount of the synthetic zeolite and clay binder and the amount of said aqueous solution is 20 to 70% by weight based on the total amount.

8. A process according to claim 6, wherein granulation of the core is performed by rolling granulation, and the secondary powdery mixture for the shell is added to the resulting wet core particles and rolling granulation is carried out again.

* * * * *